United States Patent
Gupta et al.

(10) Patent No.: US 9,090,255 B2
(45) Date of Patent: Jul. 28, 2015

(54) HYBRID VEHICLE FUEL EFFICIENCY USING INVERSE REINFORCEMENT LEARNING

(71) Applicants: Rakesh Gupta, Saratoga, CA (US); Deepak Ramachandran, Mountain View, CA (US); Adam C. Vogel, San Francisco, CA (US); Antoine Raux, Cupertino, CA (US)

(72) Inventors: Rakesh Gupta, Saratoga, CA (US); Deepak Ramachandran, Mountain View, CA (US); Adam C. Vogel, San Francisco, CA (US); Antoine Raux, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 13/838,922

(22) Filed: Mar. 15, 2013

(65) Prior Publication Data
US 2014/0018985 A1 Jan. 16, 2014

Related U.S. Application Data

(60) Provisional application No. 61/671,014, filed on Jul. 12, 2012.

(51) Int. Cl.
*B60W 20/00* (2006.01)
*B60W 10/06* (2006.01)
(Continued)

(52) U.S. Cl.
CPC ............ *B60W 20/104* (2013.01); *B60W 10/06* (2013.01); *B60W 10/26* (2013.01); *G01C 21/3469* (2013.01); *B60W 2530/14* (2013.01); *B60W 2550/143* (2013.01); *B60W 2550/402* (2013.01);

(Continued)

(58) Field of Classification Search
CPC ............... B60W 2530/14; B60W 2550/143; B60W 2550/402; B60W 2600/00; B60W 10/26; B60W 10/06; B60W 20/104; Y10S 903/93; G01C 21/3469
USPC ......... 701/22, 99, 123, 424, 521; 340/995.18, 340/995.19, 995.27; 180/65.265; 903/930
See application file for complete search history.

(56) References Cited

U.S. PATENT DOCUMENTS

| 6,445,308 | B1 | 9/2002 | Koike |
| 6,487,477 | B1 | 11/2002 | Woestman et al. |
| 6,861,957 | B2 | 3/2005 | Koike |

(Continued)

OTHER PUBLICATIONS

Gong, Q. et al., "Trip Based Optimal Power Management of Plug-in Hybrid Electric Vehicles Using Gas-Kinetic Traffic Flow Model," *2008 American Control Conference*, Jun. 11-13, 2008, pp. 3225-3230, Seattle, Washington, USA.

(Continued)

*Primary Examiner* — Jason Holloway
(74) *Attorney, Agent, or Firm* — Fenwick & West LLP; Mark Duell

(57) ABSTRACT

A powertrain of a hybrid electric vehicle (HEV) is controlled. A first value $\alpha_1$ and a second value $\alpha_2$ are determined. $\alpha_1$ represents a proportion of an instantaneous power requirement ($P_{req}$) supplied by an engine of the HEV. $\alpha_2$ controls a recharging rate of a battery of the HEV. A determination is performed, based on $\alpha_1$ and $\alpha_2$, regarding how much engine power to use ($P_{eng}$) and how much battery power to use ($P_{batt}$). $P_{eng}$ and $P_{batt}$ are sent to the powertrain.

22 Claims, 5 Drawing Sheets

(51) Int. Cl.
*B60W 10/26* (2006.01)
*G01C 21/34* (2006.01)

(52) U.S. Cl.
CPC ........... *B60W 2600/00* (2013.01); *Y10S 903/93* (2013.01)

(56) References Cited

U.S. PATENT DOCUMENTS

| | | | |
|---|---|---|---|
| 7,240,750 | B2 | 7/2007 | Patel |
| 7,925,426 | B2* | 4/2011 | Koebler et al. ............... 701/123 |
| 7,954,579 | B2 | 6/2011 | Rodriguez et al. |
| 8,095,290 | B2 | 1/2012 | Smyth et al. |
| 8,190,318 | B2* | 5/2012 | Li et al. ............. 701/22 |
| 8,190,319 | B2 | 5/2012 | Syed et al. |
| 8,234,027 | B2* | 7/2012 | Yamada ............ 701/22 |
| 8,301,323 | B2 | 10/2012 | Niwa |
| 8,386,169 | B2 | 2/2013 | Nguyen |
| 8,408,341 | B2 | 4/2013 | Dalum et al. |
| 8,428,804 | B2* | 4/2013 | Sakai et al. ............ 701/22 |
| 8,583,343 | B2* | 11/2013 | Yamada et al. ............ 701/99 |
| 8,731,752 | B2* | 5/2014 | Yu et al. ............ 701/22 |
| 2002/0107618 | A1* | 8/2002 | Deguchi et al. ............ 701/22 |
| 2008/0319596 | A1* | 12/2008 | Yamada ............ 701/22 |
| 2009/0114463 | A1* | 5/2009 | DeVault ............ 180/65.29 |
| 2009/0259363 | A1* | 10/2009 | Li et al. ............ 701/36 |
| 2011/0022259 | A1* | 1/2011 | Niwa ............ 701/22 |
| 2011/0066310 | A1* | 3/2011 | Sakai et al. ............ 701/22 |
| 2011/0184622 | A1* | 7/2011 | Yamada et al. ............ 701/99 |
| 2012/0032637 | A1* | 2/2012 | Kotooka et al. ............ 320/109 |
| 2012/0116626 | A1 | 5/2012 | Perkins et al. |
| 2015/0025727 | A1* | 1/2015 | Engman et al. ............ 701/22 |

OTHER PUBLICATIONS

Lincoln Laboratory—Massachusetts Institute of Technology, "Hybrid Technology: A Route to Energy Savings," Nov. 2010, three pages, [Online] [Retrieved Jun. 28, 2012] Retrieved from the Internet <URL: http://www.ll.mit.edu/publications/labnotes/hybridtech.html>.

Luft, A., "Ford Applies Google Prediction API to Optimize Energy Efficiency in Plug-In Electric Vehicles (With Video)," May 22, 2011, three pages, [Online] [Retrieved Jun. 21, 2012] Retrieved from the Internet <URL: http://fordauthority.com/2011/05/ford-harnesses-google-prediction-api-to-optimize-energy-efficiency-in-plug-in-electric-vehicles-with-video/>.

Moura, S. et al., "A Stochastic Optimal Control Approach for Power Management in Plug-In Hybrid Electric Vehicles," *IEEE Transactions on Control Systems Technology*, May 2011, pp. 545-555, vol. 19, No. 3.

Sutton, R.S. et al., "Between MDPs and Semi-MDPs: Learning, Planning, and Representing Knowledge at Multiple Temporal Scales," *Computer Science Department Faculty Publication Series*, Paper 213, *Journal of Artificial Intelligence Research*, 1998, pp. 1-39, University of Massachusetts—Amherst, USA.

Treiber, M. et al., "Congested traffic states in empirical observations and microscopic simulations," *Physical Review E*, Aug. 2000, pp. 1805-1824, vol. 62, No. 2.

Vogel, A. et al., "Improving Hybrid Vehicle Fuel Efficiency Using Inverse Reinforcement Learning," *Proceedings of the Twenty-Sixth AAAI Conference on Artificial Intelligence*, 2012, pp. 384-390.

Ziebart, B.D. et al., "Maximum Entropy Inverse Reinforcement Learning," *Proceedings of the Twenty-Third AAAI Conference on Artificial Intelligence*, 2008, pp. 1433-1438.

Ziebart, B.D. et al., "Navigate Like a Cabbie: Probabilistic Reasoning from Observed Context-Aware Behavior," *Proceedings of UbiComp '08*, Sep. 21-24, 2008, pp. 322-331, Seoul, Korea.

Letchner, J. et al., "Trip Router with Individualized Preferences (TRIP): Incorporating Personalization into Route Planning," *Proceedings of the Twenty-First National Conference on Artificial Intelligence (AAAI-06), Eighteenth Innovative Applications of Artificial Intelligence Conference (IAAI-06)*, Jul. 16-20, 2006, pp. 1795-1800, vol. 2, Boston, USA.

* cited by examiner

US 9,090,255 B2

HYBRID VEHICLE FUEL EFFICIENCY USING INVERSE REINFORCEMENT LEARNING

RELATED APPLICATION

This application claims the benefit of U.S. Provisional Application No. 61/671,014, filed Jul. 12, 2012, which is incorporated by reference herein in its entirety.

BACKGROUND

1. Technical Field

This application generally relates to the field of improving hybrid vehicle fuel efficiency and, in particular, to improving hybrid vehicle fuel efficiency using inverse reinforcement learning.

2. Background Information

A Hybrid Electric Vehicle (HEV) combines a conventional internal combustion engine propulsion system (which runs on fuel) with an electric propulsion system (which runs on battery charge). The presence of the electric powertrain enables the HEV to achieve better fuel economy. Fuel usage is reduced by using an electric storage system to save part of the energy that is produced by the engine and by regenerative braking.

At any time, the proportion of electric energy and engine energy that is being used by the HEV can be optimized to improve fuel efficiency. For example, if it is known that the upcoming driving route has stop-and-go traffic with red lights, then there will be opportunities to recharge the electric battery from regenerative braking, and it is advantageous to use power from the battery. Similarly, if speed is low and the engine efficiency is better at higher revolutions-per-minute (RPM), then it may be advantageous to run the engine at higher RPM and save the extra energy in the battery.

A system controls an HEV's powertrain regarding what mix of engine power and battery power is used. The control policy implemented by the powertrain control system is critical to the HEV's fuel efficiency. Some control policies consider several factors such as the charge of the battery and how efficiently the engine operates at a given speed. These approaches do not take into account the future power requirements of the HEV. By taking into account future power requirements, a more efficient balance of engine power usage versus battery power usage can be attained. For example, fuel can be saved if the future driving route of the HEV is known. However, most of the time the destination of the HEV is unknown a priori.

APPLICATION SUMMARY

The above and other issues are addressed by a method, non-transitory computer-readable storage medium, and system for controlling a powertrain of a hybrid electric vehicle (HEV). An embodiment of the method comprises determining a first value $\alpha_1$ and a second value $\alpha_2$. $\alpha_1$ represents a proportion of an instantaneous power requirement ($P_{req}$) supplied by an engine of the HEV. $\alpha_2$ controls a recharging rate of a battery of the HEV. The method further comprises determining, based on $\alpha_1$ and $\alpha_2$, how much engine power to use ($P_{eng}$) and how much battery power to use ($P_{batt}$). The method further comprises sending $P_{eng}$ and $P_{batt}$ to the powertrain.

An embodiment of the medium stores executable computer program instructions for controlling a powertrain of a hybrid electric vehicle (HEV). The instructions determine a first value $\alpha_1$ and a second value $\alpha_2$. $\alpha_1$ represents a proportion of an instantaneous power requirement ($P_{req}$) supplied by an engine of the HEV. $\alpha_2$ controls a recharging rate of a battery of the HEV. The instructions further determine, based on $\alpha_1$ and $\alpha_2$, how much engine power to use ($P_{eng}$) and how much battery power to use ($P_{batt}$). The instructions further send $P_{eng}$ and $P_{batt}$ to the powertrain.

An embodiment of the system for controlling a powertrain of a hybrid electric vehicle (HEV) comprises at least one non-transitory computer-readable storage medium storing executable computer program instructions. The instructions comprise instructions for determining a first value $\alpha_1$ and a second value $\alpha_2$. $\alpha_1$ represents a proportion of an instantaneous power requirement ($P_{req}$) supplied by an engine of the HEV. $\alpha_2$ controls a recharging rate of a battery of the HEV. The instructions further determine, based on $\alpha_1$ and $\alpha_2$, how much engine power to use ($P_{eng}$) and how much battery power to use ($P_{batt}$). The instructions further send $P_{eng}$ and $P_{batt}$ to the powertrain.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures where like reference numbers indicate identical or functionally similar elements. Also in the figures, the left most digits of each reference number corresponds to the figure in which the reference number is first used.

Figure 1:
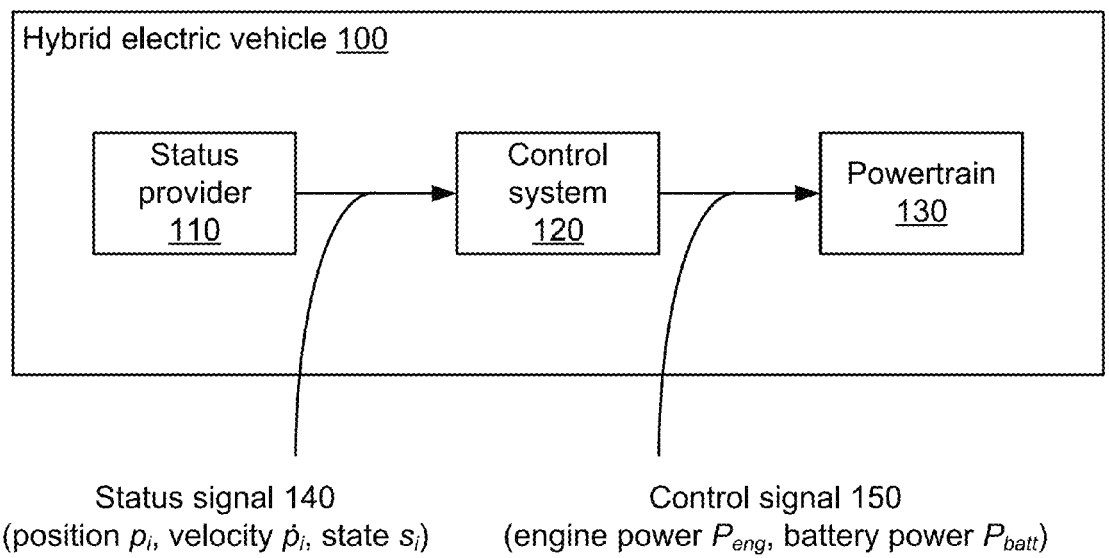
FIG. 1 is a high-level block diagram illustrating a hybrid electric vehicle with a system that controls a powertrain, in accordance with an embodiment.

FIG. 1 is a high-level block diagram illustrating a hybrid electric vehicle (HEV) 100 with a system 120 that controls a powertrain 130, in accordance with an embodiment. The control system 120 is communicatively coupled to a status provider 110 and to the powertrain 130.

The status provider 110 determines the status of the HEV 100. In one embodiment, this status includes a position value $p_i$, a velocity value $\dot{p}_i$, and a state value $s_i$. The position value $p_i$ indicates the position of the HEV 100 at time i (e.g., expressed in Global Positioning System (GPS) coordinates) and can be obtained from a sensor within the HEV 100 (e.g., a GPS unit). The velocity value indicates the velocity of the HEV 100 at time i (e.g., expressed in kilometers per hour with a directional heading) and can be obtained from a sensor within the HEV 100 (e.g., a GPS unit or a sensor that measures velocity directly from the wheels of the HEV 100).

The state value $s_i$ indicates the state of the HEV 100 at time i. In one embodiment, the state value $s_i$ includes a road segment value a battery state-of-charge (SOC) value $x_i$, and a fuel level value $f_i$. The road segment value $r_i$ indicates the location of the HEV 100 at time i with respect to a network of roads. The road network is divided into road segments, where a road segment is a portion of a road between two locations where the driver can make a decision regarding where to go next (e.g., an intersection or a highway exit), and each road segment is associated with a unique identifier. In one embodiment, the road segment value $r_i$ includes an identifier of a particular road segment and a distance value that represents a location within that particular road segment (e.g., 100 meters from the end of the road segment). Road network data can be obtained from, for example, the Open Street Map database.

The road segment value $r_i$ can be obtained from the position value $p_i$. For example, the position value $p_i$ is associated with a road segment using a Hidden Markov Model (HMM) modeled after "Trip router with individualized preferences (TRIP): incorporating personalization into route planning" by Letchner, J.; Krumm, J.; and Horvitz, E.; 2006; in AAAI; AAAI Press. In this HMM, the observations are GPS readings $o_i$, and the hidden variables are locations on road segments $s_i$. Each GPS reading $o_i$, is associated with a location on a road segment $s_i$, where $P(o_i|s_i)$ is a normal distribution over the Euclidean distance from $o_i$ to $s_i$, with mean zero and a standard deviation of 15 meters. The transition probability $P(s_i|s_{i-1})$ between road segments is proportional to the straight-line distance from $s_{i-1}$ to $s_i$ divided by the on-road distance between $s_{i-1}$ and $s_i$. This gives lower probability to road locations which are close in space but not close by the road network, which discourages the model from selecting circuitous routes.

The battery state-of-charge (SOC) value $x_i$ indicates the amount of charge of the HEV's battery at time i and can be obtained from a sensor within the HEV 100 (e.g., a sensor associated with the HEV's battery). In one embodiment, the SOC value $x_i$ indicates a relative amount of charge (e.g., a real number between 0 and 1 denoting the percentage charge of the battery). In another embodiment, the SOC value $x_i$ indicates an absolute amount of charge (e.g., expressed in volts). The fuel level value $f_i$ indicates the amount of fuel in the HEV at time i (e.g., expressed in gallons) and can be obtained from a sensor within the HEV 100 (e.g., a sensor associated with the HEV's gas tank).

The status of the HEV 100 is sent from the status provider 110 to the control system 120 in the form of status signal 140. In one embodiment, the status provider 110 sends the status signal 140 to the control system 120 periodically (e.g., once every 20 seconds). In another embodiment, the status provider 110 sends the status signal 140 to the control system 120 in response to a request received from the control system 120.

The powertrain 130 transforms stored energy into kinetic energy for propulsion purposes. The stored energy is of two types—fuel and battery charge. Specifically, the powertrain 130 includes a conventional internal combustion engine propulsion system (which runs on fuel) and an electric propulsion system (which runs on battery charge).

At a given state $s_i$, the HEV 100 is located on a road segment with a value of $r_i$ with a battery SOC value of $x_i$ and a fuel level value of $f_i$. The instantaneous power requirement $P_{req}$ is calculated using a vehicle dynamics model (described below). The control system 120 implements a control policy (sometimes referred to as a control strategy) that determines how much engine power (e.g., fuel) $P_{eng}$ and how much battery power (e.g., charge) $P_{batt}$ the powertrain 130 should use, where $P_{req}(t)=P_{eng}(t)+P_{batt}(t)$. ($P_{batt}<0$ corresponds to the case where the engine is charging the battery as well as driving the wheels.) The determined $P_{eng}$ and $P_{batt}$ are sent from the control system 120 to the powertrain 130 in the form of control signal 150. In one embodiment, $P_{eng}$ and $P_{batt}$ are measured in kilowatts.

Recall that by taking into account future power requirements, a more efficient balance of engine power usage versus battery power usage can be attained. For example, fuel can be saved if the future driving route of the HEV 100 is known. However, most of the time the destination of the HEV is unknown a priori. The control policy implemented by the control system 120 optimizes (e.g., minimizes) the powertrain's energy consumption by using a probabilistic driving route prediction system. Specifically, the control policy predicts a probability distribution over possible future paths of the HEV (i.e., possible future driving routes) based on past driver history and computes an optimal ratio of engine power $P_{eng}$ and battery power $P_{batt}$ to use such that the expected energy expenditure over this probability distribution is minimized. The computed ratio is used for a short period of time, after which the vehicle path prediction and ratio computation are performed again. This process repeats periodically. In this way, the control system 120 increases the HEV's power efficiency while not requiring any change in driver behavior (e.g., input of the route, input of the destination, or usage of a particular route) nor any hardware modification to the powertrain 130. The control system 120 will be further described below with reference to FIGS. 3 and 4.

Figure 2:
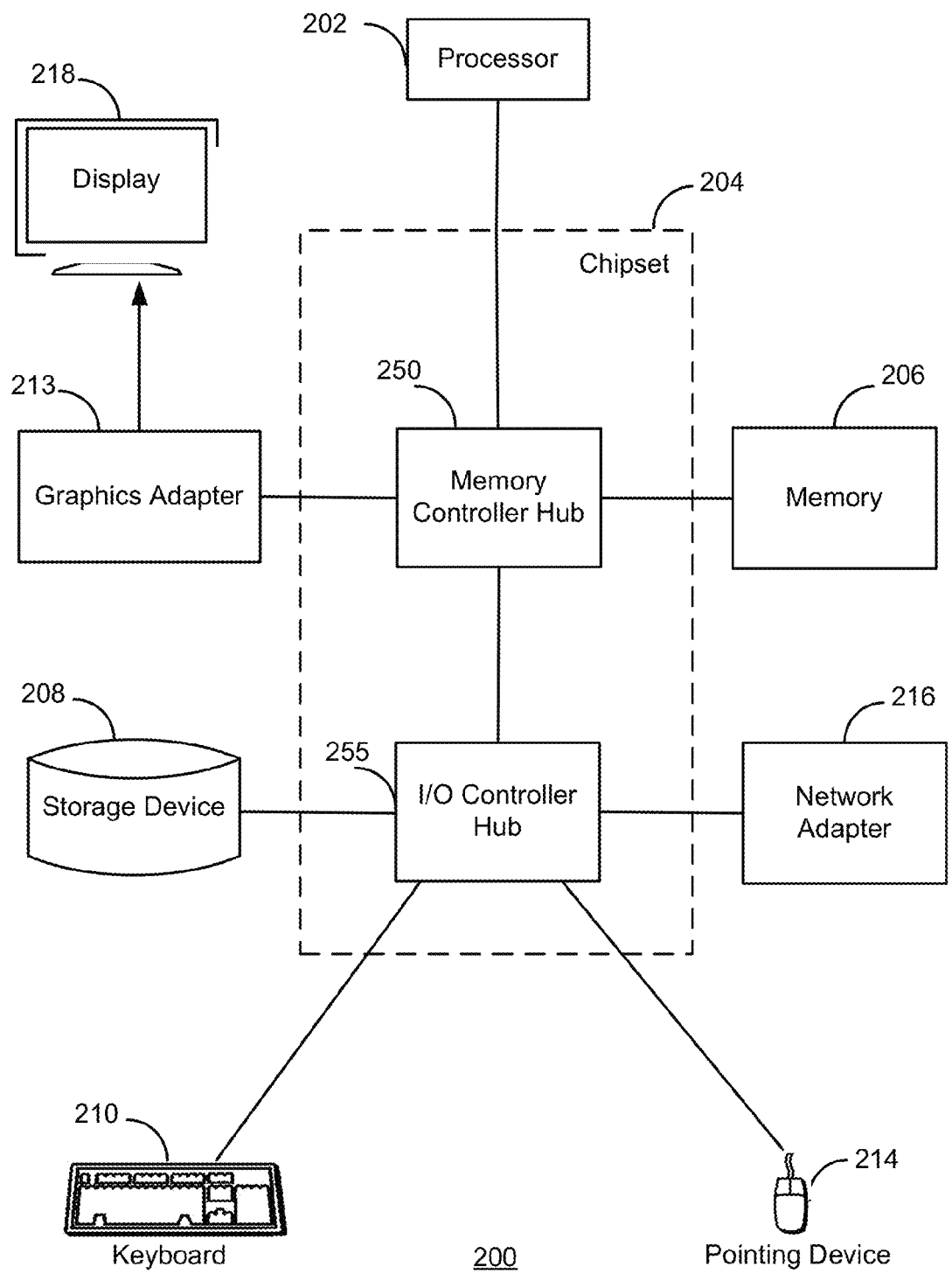
FIG. 2 is a high-level block diagram illustrating an example of a computer for use as one or more of the entities illustrated in FIG. 1, in accordance with an embodiment.

FIG. 2 is a high-level block diagram illustrating an example of a computer 200 for use as one or more of the entities illustrated in FIG. 1, in accordance with an embodiment. For example, the computer 200 can be used as the control system 120 and/or the status provider 110. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the status provider 110, the control system 120, or the powertrain 130.

Some embodiments of the computer 200 have different and/or other components than those shown in FIG. 2. For example, the control system 120 and/or the status provider 110 can be an embedded system and lack a graphics adapter 213, display device 218, keyboard 210, pointing device 214, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
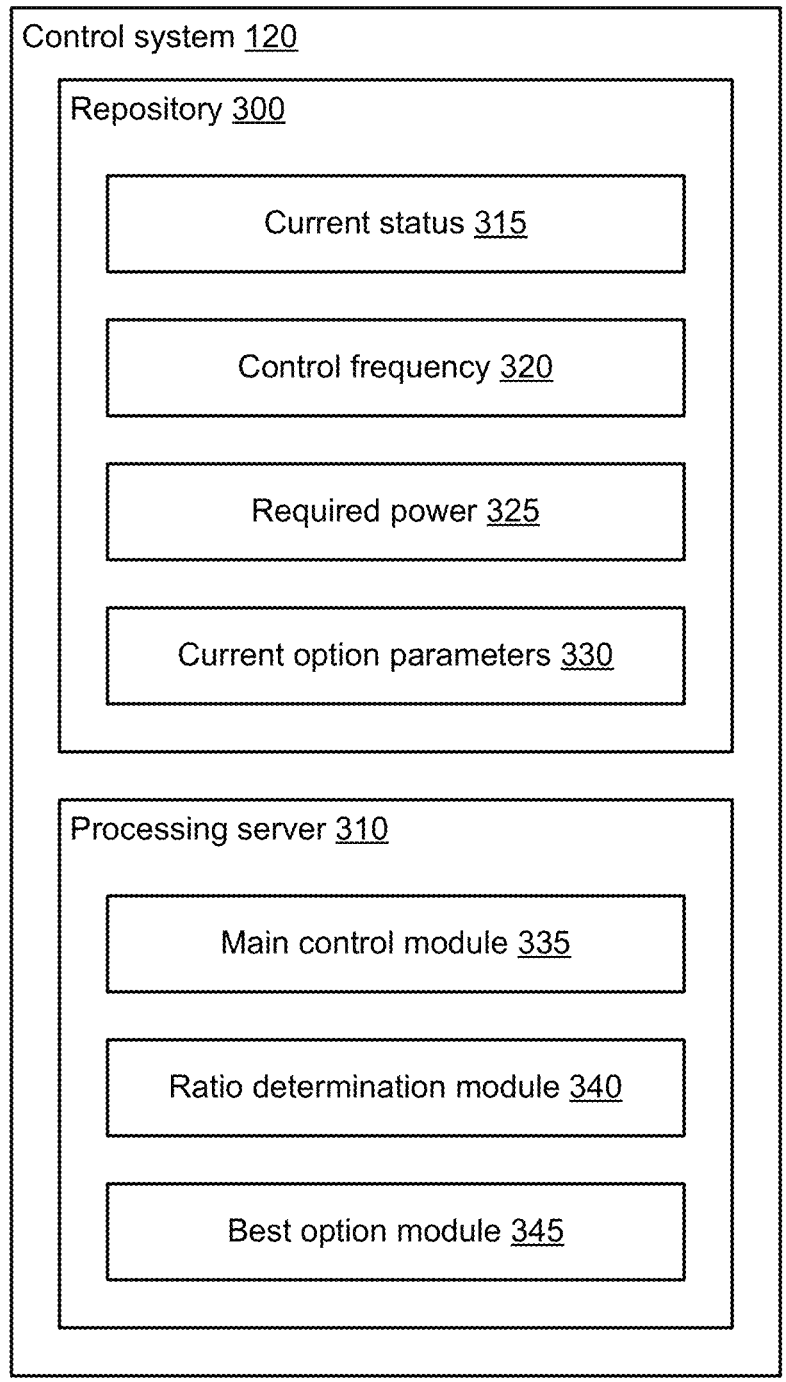
FIG. 3 is a high-level block diagram illustrating a detailed view of a control system, in accordance with an embodiment.

FIG. 3 is a high-level block diagram illustrating a detailed view of a control system 120, in accordance with an embodiment. The control system 120 includes a repository 300 and a processing server 310. The repository 300 is a computer (or set of computers) that stores a current status 315 of the HEV 100, a control frequency 320, a required power 325 of the HEV 100, and current option parameters 330. In one embodiment, the repository 300 includes a server that provides the processing server 310 access to the current status 315 of the HEV 100, the control frequency 320, the required power 325 of the HEV 100, and current option parameters 330 in response to requests.

The current status 315 of the HEV 100 indicates the HEV's current position value $p_i$, velocity value $p_i$, and state value $s_i$. Recall that the status of the HEV 100 is sent from the status provider 110 to the control system 120 in the form of status signal 140. In one embodiment, the contents of status signal 140 are stored as the current status 315 of the HEV 100. So, if status signal 140 is sent periodically (e.g., every 20 seconds), then the current status 315 of the HEV 100 is updated periodically (e.g., every 20 seconds).

The control frequency 320 indicates how often the optimal ratio (of engine power $P_{eng}$ and battery power $P_{batt}$ to use) should be recalculated. Recall that the computed ratio is used for a short period of time, after which the vehicle path prediction and ratio computation are performed again. This process repeats periodically. In one embodiment, the control frequency 320 is 20 seconds. In this embodiment, a control cycle lasts 20 seconds, which means that a computed ratio is used for 20 seconds, after which the vehicle path prediction and ratio computation are performed again.

The required power 325 of the HEV 100 indicates the HEV's instantaneous power requirement $P_{req}$. $P_{req}$ is calculated using a vehicle dynamics model (described below) and depends, in part, on the velocity and the desired acceleration of the HEV (e.g., as indicated by the driver by stepping on the gas pedal).

The current option parameters 330 fully specify a parameterized "option" by indicating one value for $\alpha_1$ and one value for $\alpha_2$. In one embodiment, $\alpha_1$ and $\alpha_2$ are real numbers in the range of 0 to 1 (inclusive). In other words, $0 \leq \alpha_1 \leq 1$, and $0 \leq \alpha_2 \leq 1$. An "option" is a mapping from a state of the HEV 100 to a powertrain controller action and is described below with reference to the ratio determination module 340.

The processing server 310 includes various modules such as a main control module 335 for controlling the operation of the control system 120, a ratio determination module 340 for determining a ratio of engine power $P_{eng}$ and battery power $P_{batt}$ to use, and a best option module 345 for determining an option to use. In one embodiment, the processing server 310 includes a computer (or set of computers) that communicates with the repository 300 and processes data (e.g., by executing the main control module 335, the ratio determination module 340, and the best option module 345).

The main control module 335 controls the operation of the control system 120. The main control module 335 is described below with reference to FIG. 4.

Recall that an "option" is a mapping from a state of the HEV 100 to a powertrain controller action. Specifically, an option takes as input an instantaneous power requirement value $P_{req}$ and a SOC value $x_i$ and outputs a ratio of engine power $P_{eng}$ and battery power $P_{batt}$ to use. In one embodiment, options are parameterized and are of the form $\Pi_{\alpha 1, \alpha 2}$, where $\alpha_1$ is the proportion of $P_{req}$ supplied by the engine, and $\alpha_2$ controls the recharging rate of the battery. For example, if $\alpha_1 = 0.7$, then 70% of the power is supplied by the engine, and the remaining 30% of the power is supplied by the battery. If $\alpha_2 = 0.5$, then the battery is charged at 50% of the maximal charging power ($P_{charging}$). If $\alpha_2 = 0$, then the battery is not charged at all. If $\alpha_2 = 1$, then the battery is charged at its maximal charging rate.

For example, an option is specified in pseudocode as:

If $x_i >$ Capacity then $P_{eng} = \alpha_1 \cdot P_{req}$ and $P_{batt} = (1-\alpha_1) \cdot P_{req}$
else $P_{eng} = P_{req} + \alpha_2 \cdot P_{charging}$ and $P_{batt} = -\alpha_2 \cdot P_{charging}$ where $P_{charging}$ is the maximum charging power capacity, and Capacity is the maximal relative charge allowed for the battery (a real number between 0 and 1). Note that Capacity can be less than the physical maximal charge. For instance, if Capacity=0.9, then the battery will never be charged above 90% capacity. A Capacity value of less than 1 avoids overcharging, which can harm a battery. The ratio determination module 340 implements an option using provided option parameters, thereby determining a ratio of engine power $P_{eng}$ and battery power $P_{batt}$ to use based on a provided instantaneous power requirement value $P_{req}$ and a provided SOC value $x_i$.

The best option module 345 determines an "option" to use. Specifically, when options are parameterized and are of the form $\Pi_{\alpha 1, \alpha 2}$, the best option module 345 determines one value for $\alpha_1$ (the proportion of $P_{req}$ supplied by the engine) and one value for $\alpha_2$ (which controls the recharging rate of the battery). The best option module 345 determines these parameter values by evaluating fuel usage for different options (e.g., different sets of option parameters). Basically, the best option module 345 explores different options, which results in a probability distribution of possible future states. In one embodiment, the best option module 345 searches for the best sequence of options chosen from a set of three to five options over a horizon time of T=30 minutes, where the duration of each option is 20 seconds.

For example, at a given state $s_i$, the HEV 100 is located on a road segment with a value of $r_i$ with a battery SOC value of $x_i$ and a fuel level value of $f_i$. The instantaneous power requirement $P_{req}$ is calculated using a vehicle dynamics model (described below). The action space is A={$(P_{eng}, P_{batt})$: $P_{eng} + P_{batt} = P_{req}, P_{eng} \geq 0$}. After a particular $(P_{eng}, P_{batt})$ is chosen, various models (described below) are used to update the position of the HEV, the SOC of the battery, and the fuel level, yielding $p_{i+1}$, $x_{i+1}$ and $f_{i+1}$, respectively. (Note that $r_i$, the road segment taken, is chosen by the user and is not under the policy's control. Instead, $r_i$ is part of the transition dynamics and is predicted using a model, described below.) Multiple pairs of $(P_{eng}, P_{batt})$ can be chosen to use at time i, resulting in multiple possible states at future time i+1. The process can then be repeated. A prediction model (described below) provides a predicted $P_{req}$ at time i+1, and multiple pairs of $(P_{eng}, P_{batt})$ are chosen to use at time i+1 to reach even more possible states at future time i+2.

The reward of a state s=(r, x, f), which is denoted as R(r, x, f), is the sum of residual fuel energy and battery energy for a terminal state (i.e., when the HEV has reached its destination) and zero for all other states (e.g., intermediate states).

Note that a cost term for work done in moving to the destination is not included. Destinations closer to the origin will have higher value than those further away. However, since the control system 120 cannot affect the choice of destination or the vehicle motion in any way, this cost will be "marginalized out" of the expected value function comparison. Thus, the cost term is not accounted for in the objective function.

The optimal option is found by maximizing the value function (i.e., the expected sum of rewards for all future states). By Bellman's equations, this is given by:

$$V(r_i, x_i, f_i) = R(r_i, x_i, f_i) + \sum_{r_i} P(r_{i+1}|r_i) V(r_{i+1}, x_{i+1}, f_{i+1})$$

In other words, the value V of the current state $(r_i, x_i, f_i)$ is equal to the sum of the reward R of the current state $(r_i, x_i, f_i)$ and the sum of the products of the probability of the next state (given the current state) $P(r_{i+1}|r_i)$ and the value V of the next state $(r_{i+1}, x_{i+1}, f_{i+1})$.

In one embodiment, the value function is computed by dynamic programming. However, this is inefficient, since this would involve updates for all possible states. Since only states reachable from the current initial state are important, in a different embodiment, a forward search algorithm with a receding time horizon T is used to find an approximately optimal ratio for the current state.

To determine a useful ratio, T must be rather large (e.g., comparable to the length of the trip), which means that a naïve search would require large search depth. Instead, options are used to reduce the complexity of the search space. Since an option is a temporally extended action, this treats the energy optimization problem as a semi-Markov Decision Process (SMDP). SMDPs are described in "Between mdps and semi-mdps: Learning, planning, and representing knowledge at multiple temporal scales" by Sutton, R. S.; Precup, D.; and Singh, S.; 1998. The control system 120 applies the selected option over multiple time steps, updating the option by forward search every $T_\Pi$ seconds (e.g., 20 seconds).

Figure 5:
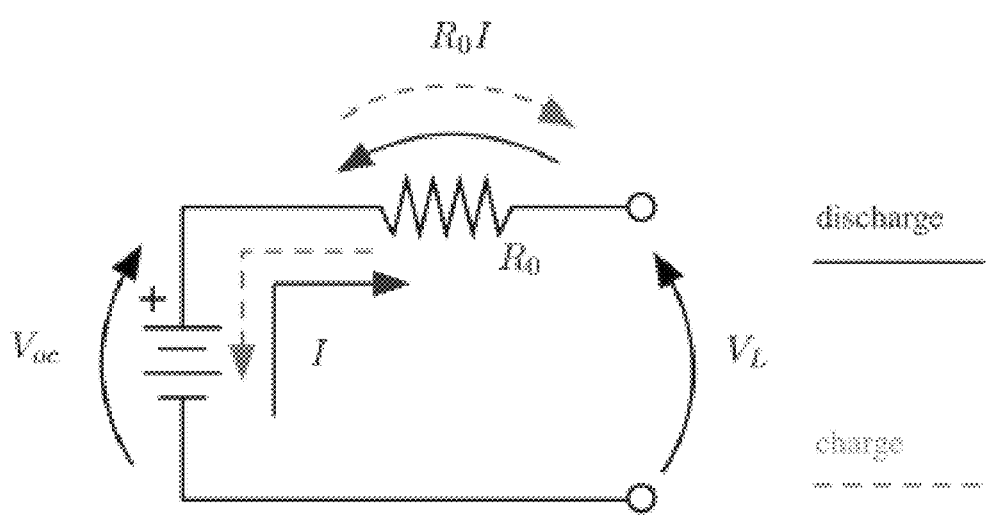
FIG. 5 is a circuit diagram for a battery, in accordance with an embodiment.

Energy Model—An energy model is used to predict a future battery SOC value $x_i$. The evolution of the battery dynamics can be found by modeling it as a simple circuit. FIG. 5 is a circuit diagram for a battery, in accordance with an embodiment. The variation in the state of charge (SOC) x is proportional to current at the battery terminals:

$$\dot{x}(t) = 1/Q_{nom} \cdot I(t)$$

where I(t) is the current (positive during discharge), and $Q_{nom}$ is the nominal charge capacitance, measured in joules. Further, $$P_{batt}(t) = V_{oc}(x)I(t) - R_o(x)I^2(t)$$

where $V_{oc}(x)$ and $R_o(x)$ are the open-circuit voltage and internal resistance, respectively, of the battery.

$R_o(x)$ is set to 0.01 ohms, and $V_{oc}(x) = 1.4x + 3.18$, where $x \in [0,1]$ is the relative charge of the battery, and $V_{oc}$ is measured in volts. Combining these equations, the derivative of the SOC is:

$$\dot{x}(t) = -\frac{1}{Q_{nom}} \frac{V_{oc}(x) + \sqrt{V_{oc}^2(x) - 4R_0(x)P_{batt}(t)}}{2R_0(x)}$$

x(t) can now be solved for to update the battery state.

$$x(t+1) = x(t) + \dot{x}(t)$$

A rate of 1 Hz is simulated, and Euler integration is used to track the SOC over time.

Vehicle Dynamics Model—A vehicle dynamics model is used to predict a future power requirement $P_{req}$. Four forces act on the HEV 100: the powertrain 130, rolling friction, air resistance, and gravitational force.

$$F_{car} = F_{eng} - F_{friction} - F_{air} - F_g$$

where $$F_{car} = ma$$

$$F_{friction} = c_{rr} mg \cos(\Theta)$$

$$F_{air} = \tfrac{1}{2} c_w A \rho v^2$$

$$F_g = mg \sin(\Theta)$$

The constant m represents the mass of the HEV 100. The constant A represents the surface area of the HEV's front. The constant $c_w$ represents the drag coefficient of wind resistance. The constant $c_{rr}$ represents the coefficient of rolling resistance. The values of m, A, $c_w$, and $c_{rr}$ vary based on the HEV. For a typical HEV, m has a value of 1000 kg; A has a value of 2 m², $c_w$ has a value of 0.42, and $c_{rr}$ has a value of 0.01. The constant $\rho$ represents the density of air and has a value of 1.225 kg/m³.

To compute the power required by the engine, the approximation P=Fv_bar is used, which gives:

$$P_{eng} = ma\bar{v} + c_{rr} mg\cos(\theta)\bar{v} + \frac{1}{2} c_w A \rho \bar{v}^3 + mg\sin(\theta)\bar{v}$$

To model the fuel consumption as a function of required power, an assumption is made that the engine speed is operated at the optimal operating line (OOL). This gives a linear mapping from required power to fuel consumption, given by $$\Delta \text{fuel} = \alpha P_{eng}$$

where $P_{eng}$ is measured in kW, and fuel consumption is measured in gallons per second. The value of $\alpha$ is 0.1.

Velocity Prediction Model—A velocity prediction model is used to predict future velocity values $\dot{p}_i$, which affect future power requirements $P_{req}$. To generate the driving cycle from the predicted route of the driver, the Intelligent Driver Model (IDM) is adapted from "Congested traffic states in empirical observations and microscopic simulations" by Treiber, M.; Hennecke, A.; and Helbing, D.; 2000; *Physical Review E* 62:1805. The IDM computes car acceleration and braking by combining the desired velocity of a driver with the distance to obstacles. Originally developed to model car-following behavior, the IDM is used by treating stop-signs and lights as cars with zero velocity. Thus, typical behavior is for a vehicle to accelerate from the beginning of a road segment up to the speed limit and then decelerate as it approaches the next stopping point.

$$\dot{v} = a\left(1 - \left(\frac{v}{v_0}\right)^\delta\right) - b\frac{v^2}{4s^2}$$

where the variable a represents maximum acceleration, the variable v represents current velocity, the variable $v_0$ represents desired velocity (assumed to be the speed limit), the variable b represents maximum braking deceleration, the variable s represents distance to next stop, and the variable $\delta$ is a smoothness parameter set to a value of 4.

Personal Driver Model—A personal driver model is used to compute the probability of an entire route, which affects future velocity values $\dot{p}_i$. The probability of a route zeta is computed by:

$$P(\varsigma \mid \theta) = \frac{e^{-cost(\varsigma \mid \theta)}}{\sum_{paths'} e^{-cost(\varsigma' \mid \theta)}}$$

where $\Theta$ is a weight vector learned by an inverse reinforcement learning algorithm. Specifically, a model of driver behavior is learned using the Maximum Entropy Inverse Reinforcement Learning (MaxEnt IRL) approach. An extended application of the MaxEnt IRL algorithm to modeling taxicab driver behavior called PROCAB was described in "Navigate like a cabbie: Probabilistic reasoning from observed context-aware behavior" by Ziebart, B. D.; Maas, A.; Bagnell, J. A.; and Dey, A. K.; 2008; in *Proc. Ubicomp*, 322-331. The personal driver model is similar to the PROCAB system.

In PROCAB, the driver's route choice is modeled as a Markov Decision process (MDP). States $s_j$ in the MDP correspond to road segments in the network. The actions available at a given state are all the possible turns $a_j$ the driver could make at the intersection at the end of $s_j$.

Each driver is assumed to have an implicit cost function that expresses his preferences over trip segments and routes. This function is represented as a linear combination of action features $f_{aj}$ with a weight vector $\Theta$:

$$cost(a_j) = \Theta^T f_{aj}$$

The features $f_{aj}$ capture salient aspects of the driving route, where $a_j$ is a transition from road segment $s_j$ to $s_{j+1}$. In one embodiment, these features include:
a) The identity of the outgoing road segment $s_{j+1}$. This feature models driver preferences for specific roads.
b) The type of road $s_{j+1}$ is, such as residential, highway, etc. This feature models driver preferences like taking the highway versus a service road.
c) The angle of turn between $S_j$ and $s_{j+1}$, discretized into left, straight, right, and U-turn. Using these features enables the ability to learn that U-turns are uncommon, and that drivers frequently go straight through an intersection.
d) Elevation change along the road segment. This feature models driver preference for lesser inclines.
e) Cardinal direction of the road segment (e.g., North, South, East, or West). This feature models driver preferences for driving in certain directions.

Each of these features is conjoined with a time-of-day feature, which can capture daily routines. For instance, in the morning, drivers are likely heading to work, and perhaps in the afternoon they drive to pick up their child from school.

Given a route $\varsigma = (s_0, a_0, s_1, a_1, \ldots, a_{n-1}, s_n)$, let $f_\varsigma$ be the sum of the features for each action along the route: $f_\varsigma = \Sigma_j f_{aj}$. The driver is assumed to prefer a route $\varsigma$ to the extent that $\varsigma$ minimizes the cost function:

$$cost(f_\varsigma) = \theta^T f_\varsigma = \sum_{a_j \in \varsigma} \theta^T f_{aj}$$

The problem is to recover the parameters of this function given the demonstrated behavior of the driver in the form of a collection of trajectories $\varsigma_i$. This problem is known as Inverse Reinforcement Learning (IRL) in the RL literature. The key challenge in IRL is that it is under-constrained: multiple viable cost functions are possible (in particular, uniform zero costs can explain any action). Additional assumptions or constraints are needed to choose among the cost functions. The principle of maximum entropy is used to identify a distribution over paths given $\Theta$ that exhibits no additional preferences beyond matching observed behavior:

$$P(\varsigma_i \mid \theta) = \frac{1}{Z(\theta)} e^{-\theta^T f_{\varsigma_i}} = \frac{1}{Z(\theta)} e^{-\Sigma_{a_j \in \varsigma_i} \theta^T f_{aj}}$$

where $Z(\Theta)$ is a normalization factor. This yields a stochastic policy where the probability of action a is weighted by the expected exponentiated rewards of all paths that begin with a:

$$P(a \mid \theta) \propto \sum_{\varsigma: a \in \varsigma_{i=0}} P(\varsigma \mid \theta)$$

This approach overcomes the label bias problem that affects IRL methods using local action potentials to define the distribution.

The likelihood of the observed data max-entropy distribution defined above is maximized with respect to parameters $\Theta$, obtaining:

$$\theta^* = \operatorname{argmax}_\theta L(\theta) = \operatorname{argmax}_\theta \sum_{examples} \log P(\varsigma \mid \theta)$$

For a deterministic MDP, this function is convex, and its maximum can be found using an online exponentiated gradient ascent algorithm. The gradient of the log likelihood has an elegant representation as the difference between the empirical feature counts and the model's expected feature counts:

$$\nabla L(\theta) = \tilde{f} - \sum_\varsigma P(\varsigma \mid \theta) f_\varsigma = \tilde{f} - \sum_{a_j} D_{a_j} f_{a_j},$$

where $D_{aj}$ is the expected number of times turning action $a_j$ is taken, and ftilde are the empirical feature counts. A straightforward computation of $D_{aj}$ would require enumerating all paths from $a_j$. Instead, an efficient forward-backward dynamic programming algorithm is used to perform the inference. This algorithm is described in "Navigate like a cabbie: Probabilistic reasoning from observed context-aware behavior" by Ziebart, B. D.; Maas, A.; Bagnell, J. A.; and Dey, A. K; 2008; in *Proc. Ubicomp*, 322-331.

Figure 4:
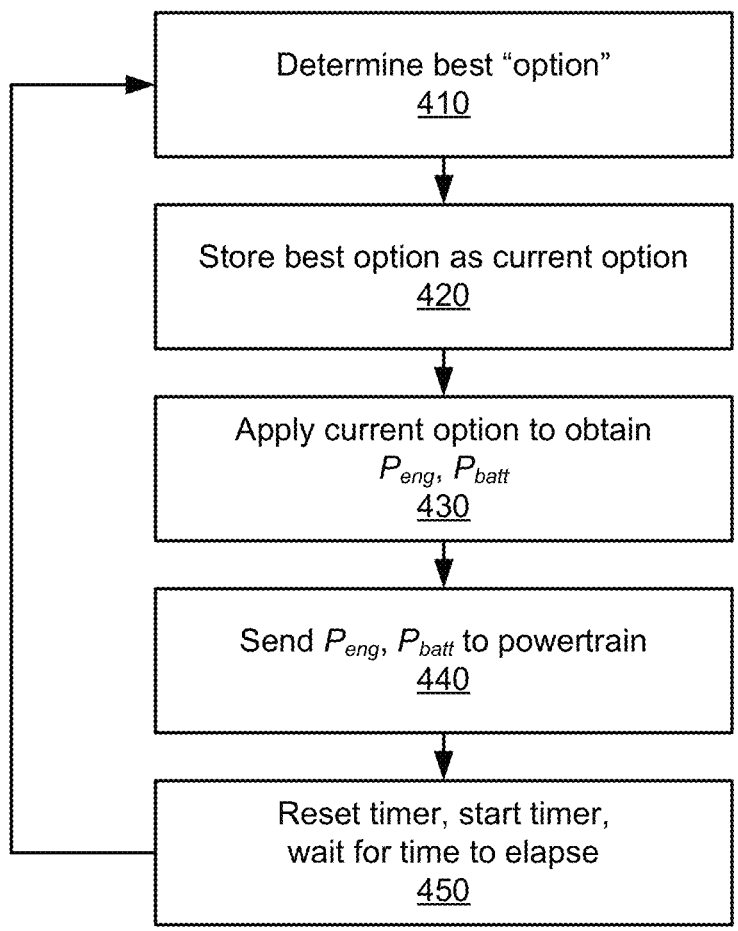
FIG. 4 is a flowchart illustrating a method of controlling a powertrain of a hybrid electric vehicle, in accordance with an embodiment.

FIG. 4 is a flowchart illustrating a method 400 of controlling a powertrain 130 of a hybrid electric vehicle 100, in accordance with an embodiment. The method 400 is performed by, for example, the main control module 335. Other embodiments can perform the steps in different orders and can include different and/or additional steps. In addition, some or all of the steps can be performed by entities other than those shown in FIGS. 1 and 3.

When the method 400 starts, appropriate values have already been stored in current status 315, control frequency 320, and required power 325. At this point, the method 400 begins.

In step 410, a best "option" is determined. For example, the main control module 335 executes the best option module 345 using the position value $p_i$, the velocity value $\dot{p}_i$, and the state value $s_i$ stored in current status 315 as inputs. The best option module 345 then outputs one value for $\alpha_1$ and one value for $\alpha_2$.

In step 420, the best option is stored as the current option. For example, the main control module 335 stores the value for $\alpha_1$ and the value for $\alpha_2$ (computed in step 410) in current option parameters 330.

In step 430, the current option is applied to obtain $P_{eng}$ and $P_{batt}$. For example, the main control module 335 executes the ratio determination module 340 using the $\alpha_1$ and $\alpha_2$ values stored in current option parameters 330 as option parameters and using the $P_{req}$ value stored in required power 325 and the $x_i$ value stored in current status 315 as inputs. The ratio determination module 340 then outputs $P_{eng}$ and $P_{batt}$.

In step 440, $P_{eng}$ and $P_{batt}$ are sent to the powertrain 130. For example, the main control module 335 sends $P_{eng}$ and $P_{batt}$ (computed in step 430) to the powertrain 130 in the form of control signal 150.

In step 450, a timer is reset and started, and the lapse of time is awaited. For example, the main control module 335 resets a timer to zero, starts the timer, and waits for the timer to reach the time value stored in control frequency 320, This waiting causes the option specified by the current option parameters 330 to be applied by the control system 120 over multiple time steps.

The method 400 then repeats, starting at step 410.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these, quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, o the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer based method for controlling a powertrain of a hybrid electric vehicle (HEV) having an engine and a battery, comprising steps of:
   collecting route information about a plurality of driving routes, wherein each driving route is comprised of a plurality of route segments connected by a plurality of intersections;
   predicting a probability distribution over possible future route segments of multiple possible routes to be traversed by the HEV based on the collected route information;
   computing a first value $\alpha_1$ and a second value $\alpha_2$, wherein $\alpha_1$ represents a proportion of an instantaneous power requirement ($P_{req}$) supplied by an engine of the HEV, and $\alpha_2$ controls a recharging rate of a battery of the HEV, such that an expected energy expenditure over the probability distribution is reduced;
   determining, based on $\alpha_1$ and $\alpha_2$, how much engine power to use ($P_{eng}$) and how much battery power to use ($P_{batt}$); and
   operating the powertrain according to $P_{eng}$ and $P_{batt}$.

2. The method of claim 1, further comprising repeating the steps of claim 1 after a time period has elapsed.

3. The method of claim 1, wherein predicting the probability distribution over possible future paths of the HEV is performed based on past driver history.

4. The method of claim 3, wherein past driver history the route information includes a set of action features (f) that represent aspects of each of the plurality of driving route intersections.

5. The method of claim 4, wherein f includes one or more elements of the group containing:
   an identity of an outgoing road segment;
   a type of a road segment;
   an angle of turn between an incoming road segment and an outgoing road segment;
   an elevation change of a road segment; and
   a cardinal direction of a road segment.

6. The method of claim 1, wherein computing the first value $\alpha_1$ and the second value $\alpha_2$ such that the expected energy expenditure over the probability distribution is reduced comprises maximizing a value function V given by:

$$V(r_i, x_i, f_i) = R(R_i, x_i, f_i) + \sum_{r_i} P(r_{i+1} \mid r_i) V(r_{i+1}, x_{i+1}, f_{i+1})$$

wherein r represents a road segment, x represents a state-of-charge of the HEV's battery, f represents a fuel level of the HEV, ($r_i$, $x_i$, $f_i$) represents a current state of the HEV, ($r_{i+1}$, $x_{i+1}$, $f_{i+1}$) represents a next state of the HEV, and R represents a reward function.

7. The method of claim 6, wherein the reward function R of a state (r, x, f) is equal to a sum of residual fuel energy and battery energy at the state.

8. The method of claim 1, wherein determining, based on $\alpha_1$ and $\alpha_2$, how much engine power to use ($P_{eng}$) and how much battery power to use ($P_{batt}$) comprises:
   determining whether a state-of-charge of the HEV's battery (x) is larger than a maximal relative charge allowed for the battery;
   responsive to determining that x is larger than the maximal relative charge allowed for the battery:
     determining that $P_{eng} = \alpha_1 \cdot P_{req}$; and
     determining that $P_{batt} = (1-\alpha_1) \cdot P_{req}$; and
   responsive to determining that x is not larger than the maximal relative charge allowed for the battery:
     determining that $P_{eng} = P_{req} + \alpha_2 \cdot P_{charging}$; and
     determining that $P_{batt} = -\alpha_2 \cdot P_{charging}$;
     wherein $P_{charging}$ is a maximum charging power capacity of the HEV's battery.

9. A non-transitory computer-readable storage medium storing executable computer program instructions for controlling a powertrain of a hybrid electric vehicle (HEV) having an engine and a battery, the instructions performing steps comprising:
   collecting route information about a plurality of driving routes, wherein each driving route is comprised of a plurality of route segments connected by a plurality of intersections;
   predicting a probability distribution over possible future route segments of multiple possible routes to traverse by the HEV based on the collected route information;
   computing a first value $\alpha_1$ and a second value $\alpha_2$, wherein $\alpha_1$ represents a proportion of an instantaneous power requirement ($P_{req}$) supplied by an engine of the HEV, and $a_2$ controls a recharging rate of a battery of the HEV, such that an expected energy expenditure over the probability distribution is reduced;
   determining, based on $\alpha_1$ and $\alpha_2$, how much engine power to use ($P_{eng}$) and how much battery power to use ($P_{batt}$); and
   operating the powertrain according to $P_{eng}$ and $P_{batt}$.

10. The computer-readable storage medium of claim 9, wherein the instructions perform steps further comprising repeating the steps of claim 9 after a time period has elapsed.

11. The computer-readable storage medium of claim 9, wherein the route information includes a set of action features (f) that represent aspects of each of the plurality of intersections.

12. The computer-readable storage medium of claim 11, wherein f includes one or more elements of the group containing:
   an identity of an outgoing road segment;
   a type of a road segment;
   an angle of turn between an incoming road segment and an outgoing road segment;
   an elevation change of a road segment; and
   a cardinal direction of a road segment.

13. The computer-readable storage medium of claim 9, wherein computing the first value $\alpha_1$ and the second value $\alpha_2$ such that the expected energy expenditure over the probability distribution is reduced comprises maximizing a value function V given by:

$$V(r_i, x_i, f_i) = R(r_i, x_i, f_i) + \sum_{r_i} P(r_{i+1} \mid r_i) V(r_{i+1}, x_{i+1}, f_{i+1})$$

wherein r represents a road segment, x represents a state-of-charge of the HEV's battery, f represents a fuel level of the HEV, ($r_{i+}$, $x_{i+}$, $f_i$) represents a current state of the HEV, ($r_{i+1}$, $x_{i+1}$, $f_{i+1}$) represents a next state of the HEV, and R represents a reward function.

14. The computer-readable storage medium of claim 13, wherein the reward function R of a state (r, x, f) is equal to a sum of residual fuel energy and battery energy at the state.

15. The computer-readable storage medium of claim 9, wherein determining, based on $\alpha_1$ and $\alpha_2$, how much engine power to use ($P_{eng}$) and how much battery power to use ($P_{batt}$) comprises:
- determining whether a state-of-charge of the HEV's battery (x) is larger than a maximal relative charge allowed for the battery;
- responsive to determining that x is larger than the maximal relative charge allowed for the battery:
  - determining that $P_{eng} = \alpha_1 \cdot P_{req}$; and
  - determining that $P_{batt} = (1-\alpha_1) \cdot P_{req}$; and
- responsive to determining that x is not larger than the maximal relative charge allowed for the battery:
  - determining that $P_{eng} = P_{req} + \alpha_2 \cdot P_{charging}$; and
  - determining that $P_{batt} = -\alpha_2 \cdot P_{charging}$;
  - wherein $P_{charging}$ is a maximum charging power capacity of the HEV's battery.

16. A system for controlling a powertrain of a hybrid electric vehicle (HEV) having an engine and a battery, the system comprising:
- at least one non-transitory computer-readable storage medium storing executable computer program instructions comprising instructions for:
  - collecting route information about a plurality of driving routes, wherein each driving route is comprised of a plurality of route segments connected by a plurality of intersections;
  - predicting a probability distribution over possible future route segments of the HEV based on the collected route information;
  - computing a first value $\alpha_1$ and a second value $\alpha_2$, wherein $\alpha_1$ represents a proportion of an instantaneous power requirement ($P_{req}$) supplied by an engine of the HEV, and $\alpha_2$ controls a recharging rate of a battery of the HEV, such that an expected energy expenditure over the probability distribution is reduced;
  - determining, based on $\alpha_1$ and $\alpha_2$, how much engine power to use ($P_{eng}$) and how much battery power to use ($P_{batt}$); and
  - operating the powertrain according to $P_{eng}$ and $P_{batt}$; and
- a processor for executing the computer program instructions.

17. The method of claim 1, wherein determining a driver model using an inverse reinforcement learning algorithm further comprises representing the route information as a Markov decision process having states s each state having a plurality of actions a.

18. The method of claim 17, wherein each intersection is represented as a state $s_i$ and each route segment chosen at the state $s_i$ is represented as an action $a_i$.

19. The computer-readable storage medium of claim 9, wherein determining a driver model using an inverse reinforcement learning algorithm further comprises representing the route information as a Markov decision process having states s each state having a plurality of actions a.

20. The computer-readable storage medium of claim 19, wherein each intersection is represented as a state $s_i$ and each route segment chosen at the state $s_i$ is represented as an action $a_i$.

21. The method of claim 1, further comprising:
- determining a driver model by using an inverse reinforcement learning algorithm on the collected route information; and
- predicting a probability distribution over possible future route segments of the HEV based on the determined driver model given a current position of the HEV.

22. The computer-readable storage medium of claim 9, performing steps further comprising:
- determining a driver model by using an inverse reinforcement learning algorithm on the collected route information; and
- predicting a probability distribution over possible future route segments of the HEV based on the determined driver model given a current position of the HEV.

* * * * *